US012782661B2

(12) United States Patent
Gu et al.

(10) Patent No.: US 12,782,661 B2
(45) Date of Patent: Nov. 3, 2026

(54) QUICK-REPLACEMENT END COVER STRUCTURE FOR OPTICAL FIBER SPLICE CLOSURE AND OPTICAL FIBER SPLICE CLOSURE

(71) Applicant: ACCELIGHT TECHNOLOGIES (WUHAN) CO., INC., Wuhan (CN)

(72) Inventors: Gong-En Gu, Wuhan (CN); Matthew John Steven Rouleau, Pleasanton, CA (US); Neil Santos, Wuhan (CN); William Sterling, Wuhan (CN); Hengzhi Fan, Wuhan (CN); Wenbing Zhu, Wuhan (CN); Zhehuanyan Mei, Wuhan (CN); Fei Li, Wuhan (CN)

(73) Assignee: ACCELIGHT TECHNOLOGIES (WUHAN) CO., LTD., Wuhan (CN)

( * ) Notice: Subject to any disclaimer, the term of this patent is extended or adjusted under 35 U.S.C. 154(b) by 299 days.

(21) Appl. No.: 18/633,029

(22) Filed: Apr. 11, 2024

(65) Prior Publication Data

US 2025/0085499 A1 Mar. 13, 2025

Related U.S. Application Data

(63) Continuation of application No. PCT/CN2023/118538, filed on Sep. 13, 2023.

(30) Foreign Application Priority Data

Sep. 7, 2023 (CN) ......................... 202322429216.7

(51) Int. Cl.
*G02B 6/44* (2006.01)

(52) U.S. Cl.
CPC ......... *G02B 6/4454* (2013.01); *G02B 6/4444* (2013.01)

(58) Field of Classification Search
None
See application file for complete search history.

(56) References Cited

U.S. PATENT DOCUMENTS 4,913,522 A * 4/1990 Nolf ..................... G02B 6/4442 385/95
4,927,227 A * 5/1990 Bensel, III ........... G02B 6/4442 385/135

(Continued)

FOREIGN PATENT DOCUMENTS

CN 2319943 Y 5/1999
CN 110955005 A 4/2020

(Continued)

OTHER PUBLICATIONS

Written Opinion/WO for parent PCT application (Year: 2023).*

(Continued)

*Primary Examiner* — Andrew Jordan
(74) *Attorney, Agent, or Firm* — Troutman Pepper Locke LLP; Tim Tingkang Xia, Esq.

(57) ABSTRACT

The invention relates to a quick-replacement end cover structure for an optical fiber splice closure and an optical fiber splice closure, the quick-replacement end cover structure comprising: an end cover housing for being connected to a closure cap structure and an inner core main body for being connected to an internal fusion splice tray structure, where the end cover housing is provided with a feature hole for plugging of the inner core main body, an inner wall of the feature hole is provided with an axial limiting feature for axially limiting the inner core main body, first threaded connecting pieces arranged to extend along an axial direction of the feature hole are disposed in the feature hole, and second threaded connecting pieces for cooperating with the (Continued)

first threaded connecting pieces to fix the inner core main body are disposed on the inner core main body.

8 Claims, 6 Drawing Sheets

(56) References Cited

U.S. PATENT DOCUMENTS

| | | | | | |
|---|---|---|---|---|---|
| 5,185,845 | A * | 2/1993 | Jones | G02B 6/4442 | 385/135 |
| 5,280,556 | A * | 1/1994 | Jones | G02B 6/4447 | 385/139 |
| 5,481,639 | A * | 1/1996 | Cobb | G02B 6/4442 | 385/135 |
| 5,553,186 | A * | 9/1996 | Allen | G02B 6/4442 | 385/136 |
| 5,590,234 | A * | 12/1996 | Pulido | G02B 6/4442 | 385/136 |
| 5,758,004 | A * | 5/1998 | Alarcon | G02B 6/4442 | 385/136 |
| 5,774,618 | A * | 6/1998 | Jones | G02B 6/4442 | 385/134 |
| 6,014,490 | A * | 1/2000 | Canning | G02B 6/4442 | 385/137 |
| 6,263,141 | B1 * | 7/2001 | Smith | G02B 6/4455 | 385/135 |
| 6,304,707 | B1 * | 10/2001 | Daems | G02B 6/4442 | 385/71 |
| 6,411,767 | B1 * | 6/2002 | Burrous | G02B 6/4447 | 385/136 |
| 6,612,515 | B1 * | 9/2003 | Tinucci | B65H 75/143 | 242/612 |
| 6,856,747 | B2 * | 2/2005 | Cloud | H02G 3/22 | 385/135 |
| 7,045,710 | B1 * | 5/2006 | Allen | H02G 15/076 | 174/38 |
| 7,650,055 | B2 * | 1/2010 | Cox | G02B 6/4444 | 174/64 |
| 7,689,090 | B2 * | 3/2010 | Kluwe | H02G 15/013 | 385/134 |
| 7,697,812 | B2 * | 4/2010 | Parikh | G02B 6/4442 | 385/134 |
| 8,055,114 | B2 * | 11/2011 | Kluwe | H02G 15/076 | 385/139 |
| 8,755,663 | B2 * | 6/2014 | Makrides-Saravanos | G02B 6/4442 | 385/135 |
| 8,873,926 | B2 * | 10/2014 | Beamon | G02B 6/44775 | 385/136 |
| 10,234,647 | B2 * | 3/2019 | Stancyk | G02B 6/44515 | |
| 10,869,401 | B1 * | 12/2020 | Thompson | H05K 5/13 | |
| 12,353,038 | B1 * | 7/2025 | Gu | G02B 6/4442 | |
| D1,109,708 | S * | 1/2026 | Fan | D13/154 | |
| 12,554,182 | B2 * | 2/2026 | Platner | G02B 7/14 | |
| 2004/0256138 | A1 * | 12/2004 | Grubish | G02B 6/44528 | 174/93 |
| 2024/0109694 | A1 * | 4/2024 | Meyers | A47G 19/2266 | |
| 2024/0255720 | A1 * | 8/2024 | Fan | G02B 6/44 | |
| 2024/0255721 | A1 * | 8/2024 | Fan | G02B 6/255 | |
| 2024/0377601 | A1 * | 11/2024 | Fan | G02B 6/44775 | |
| 2025/0004230 | A1 * | 1/2025 | Fan | G02B 6/44524 | |
| 2025/0028133 | A1 * | 1/2025 | Fan | G02B 6/4442 | |
| 2025/0085499 | A1 * | 3/2025 | Rouleau | G02B 6/4454 | |
| 2026/0043970 | A1 * | 2/2026 | Gu | G02B 6/3886 | |
| 2026/0043974 | A1 * | 2/2026 | Gu | G02B 6/30 | |
| 2026/0043982 | A1 * | 2/2026 | Gu | G02B 6/44775 | |
| 2026/0072227 | A1 * | 3/2026 | Gu | G02B 6/4447 | |

FOREIGN PATENT DOCUMENTS

| | | | |
|---|---|---|---|
| CN | 113703109 | A | 11/2021 |
| CN | 114415304 | A | 4/2022 |
| KR | 20130041648 | A | 4/2013 |

OTHER PUBLICATIONS

International Preliminary Report on Patentability/IPRP for parent PCT application (Year: 2026).*

International Search Report issued for Application No. PCT/CN2023/118538, China National Intellectual Property Administration, Nov. 24, 2023, China.

* cited by examiner

QUICK-REPLACEMENT END COVER STRUCTURE FOR OPTICAL FIBER SPLICE CLOSURE AND OPTICAL FIBER SPLICE CLOSURE

CROSS-REFERENCE TO RELATED APPLICATIONS

This application is a continuation application of PCT Patent Application No. PCT/CN2023/118538, filed Sep. 13, 2023, which itself claims priority to Chinese Patent Application No. 202322429216.7, filed Sep. 7, 2023, which are hereby incorporated herein in their entireties by reference.

TECHNICAL FIELD

The present invention relates generally to the technical field of optical fiber splice closures, and more particularly to a quick-replacement end cover structure for an optical fiber splice closure and an optical fiber splice closure.

BACKGROUND

An optical fiber splice closure is a device for protecting an optical cable connection, providing optical, sealing and mechanical strength continuity. It is mainly applicable to straight-through and branch connection of optical cables of various structures that are laid in a manner such as aerial laying, pipe laying, and directly-buried laying. These closure bodies are generally made of synthetic plastics, have high strength, corrosion resistance and water resistance, and are widely applied in fields such as communication, network systems, cable television and cable network systems.

Generally, the optical fiber splice closure is composed of a closure cap structure, an internal fusion splice tray structure and an end cover structure. The closure cap structure and the end cover structure are fixed together through a hoop structure 2. The internal fusion splice tray structure is located in the closed space and is directly connected to the end cover structure. An optical cable entering assembly is further mounted on the end cover structure, the optical cable entering assembly is welded and connected with the internal fusion splice tray structure, and the optical cable entering assembly, the internal fusion splice tray structure and the end cover structure constitute an integrated structure. Over time, an optical fiber splice closure housing formed by plastic injection molding is extremely vulnerable to damage, particularly the end cover structure.

When the end cover structure is damaged or the service life ends, the end cover structure needs to be replaced, and the steps thereof comprise: firstly, the hoop structure needs to be unfastened to separate the end cover structure from the closure cap structure, then the optical cable entering assembly, the internal fusion splice tray structure and the end cover structure are separated. After a new closure cap structure is replaced, the optical cable entering assembly, the internal fusion splice tray structure and a new end cover structure are connected into one piece. When replacing the end cover structure, the above solution not only needs to separate the original optical cable entering assembly, the internal fusion splice tray structure and the end cover structure which are of an integrated structure, but also needs to weld the new end cover structure, the optical cable entering assembly and the internal fusion splice tray structure into a new integrated structure. Therefore, there are technical defects of time-consuming and low efficiency in replacement.

To improve the maintenance efficiency of the optical fiber splice closure, an end cover structure needs to be redesigned to simplify the replacement process of the end cover structure and avoid re-fusion splicing of the internal fusion splice tray structure, thereby reducing the maintenance costs and improving the convenience of operation.

SUMMARY

Embodiments of the present application provides a quick-replacement end cover structure for an optical fiber splice closure and an optical fiber splice closure. This effectively simplifies the replacement process of the end cover structure, avoids re-fusion splicing of the internal fusion splice tray structure, thereby reducing the maintenance costs and improving the convenience of operation.

An embodiment of the present application provides a quick-replacement end cover structure for an optical fiber splice closure, comprising: an end cover housing for being connected to a closure cap structure and an inner core main body for being connected to an internal fusion splice tray structure, where the end cover housing is provided with a feature hole for plugging of the inner core main body, an inner wall of the feature hole is provided with an axial limiting feature for axially limiting the inner core main body, first threaded connecting pieces arranged to extend along an axial direction of the feature hole are disposed in the feature hole, and second threaded connecting pieces for cooperating with the first threaded connecting pieces to fix the inner core main body are disposed on the inner core main body.

In a preferred embodiment of the present invention, the inner core main body comprises outer conical curved surface features arranged in a circumferential rotational symmetry manner relative to a central axis thereof, and the inner wall of the feature hole is provided with inner conical curved surface features corresponding to the outer conical curved surface features.

In a preferred embodiment of the present invention, the inner core main body comprises a body portion in a cylindrical shape and a plurality of protruding portions arranged at intervals along a circumferential direction of the body portion, and the outer conical curved surface feature is disposed on a peripheral surface of each protruding portion.

In a preferred embodiment of the present invention, mounting grooves in one-to-one correspondence with the protruding portions are disposed on the inner wall of the feature hole, and the inner conical curved surface feature is disposed on a peripheral surface of the mounting groove.

In a preferred embodiment of the present invention, a silicone rubber for improving a sealing effect is disposed on the inner conical curved surface feature.

In a preferred embodiment of the present invention, the axial limiting feature is a limiting lug boss arranged along a circumferential direction of the feature holes and extending in a radial direction thereof, and the limiting lug boss is provided with holes for the first threaded connecting pieces to pass through.

In a preferred embodiment of the present invention, a pressing sheets are plugged to the first threaded connecting pieces, and the limiting lug boss is located between the pressing sheets and the inner core main body.

In a preferred embodiment of the present invention, the inner wall of the feature hole is provided with guiding strips extending along an axial direction thereof, and a through groove cooperating with the pressing sheet is disposed on the pressing sheet.

In a preferred embodiment of the present invention, the inner core main body is provided with mounting feature holes for mounting an optical cable entering assembly.

In a preferred embodiment of the present invention, the first threaded connecting pieces are screws, and the second threaded connecting pieces are nuts embedded on the inner core main body or threaded holes machined on the inner core main body.

The present invention discloses an optical fiber splice closure, comprising a closure cap structure and an end cover, where the end cover is the quick-replacement end cover structure.

The beneficial effects brought about by the technical solutions provided in the present application comprise: the present invention has the advantages of simple structure, convenient disassembly and high replacement efficiency, an original integrated end cover is inventively split into a split structure composed of the end cover housing and the inner core main body. Thus, when the end cover is replaced, only the end cover housing needs to be replaced, and the inner core main body does not need to be replaced, thereby ensuring that the inner core main body, the optical cable entering assembly and the internal fusion splice tray structure are always of a new integrated structure. Thus, the replacement efficiency of the end cover is improved, and a large amount of time and manpower required in a process of re-fusion splicing of optical fibers are saved;

further, the inner core main body provided by the present invention comprises outer conical curved surface features arranged in a circumferential rotational symmetry manner relative to a central axis thereof, and the inner wall of the feature hole is provided with inner conical curved surface features corresponding to the outer conical curved surface features. By introducing the outer conical curved surface features and the inner conical curved surface features, the mounting coaxiality between the inner core main body and the end cover housing can be ensured, furthermore, the sealing effect can be effectively achieved (extrusion force generated by the inclined surface cooperation can achieve the tight fitting between the inner core main body and the end cover housing);

further, the inner core main body provided by the present invention comprises a body portion in a cylindrical shape and a plurality of protruding portions arranged at intervals along a circumferential direction of the body portion, and the outer conical curved surface feature is disposed on a peripheral surface of each protruding portion. Mounting grooves in one-to-one correspondence with the protruding portions are disposed on the inner wall of the feature hole, and the inner conical curved surface feature is disposed on a peripheral surface of the mounting groove. This structure facilitates the assembly of the inner core main body, and in addition, facilitates the welding between the optical cable entering assembly and the internal fusion splice tray structure;

further, the axial limiting feature provided by the present invention is a limiting lug boss arranged along a circumferential direction of the feature hole and extending in a radial direction thereof, and the limiting lug boss is provided with holes for the first threaded connecting pieces to pass through. This structure facilitates the assembly of the first threaded connecting pieces;

further, the first threaded connecting pieces provided by the present invention are plugged to pressing sheets, and the limiting lug boss is located between the pressing sheets and the inner core main body. This structure facilitates the disassembly and fixing of the inner core main body;

further, the inner wall of the feature hole provided by the present invention is provided with guiding strips extending along an axial direction thereof, and a through groove cooperating with the pressing sheet is disposed on the pressing sheet. This structure facilitates the mounting of the pressing sheets, the pressing sheets pull down the inner core of the end cover until the inner core of the end cover and the end cover housing are closely attached; and further, the inner core main body provided by the present invention is provided with mounting feature holes for mounting an optical cable entering assembly. This structure facilitates the welding between the fiber optical cable entering assembly and the inner fusion splice tray.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

Figure 1:
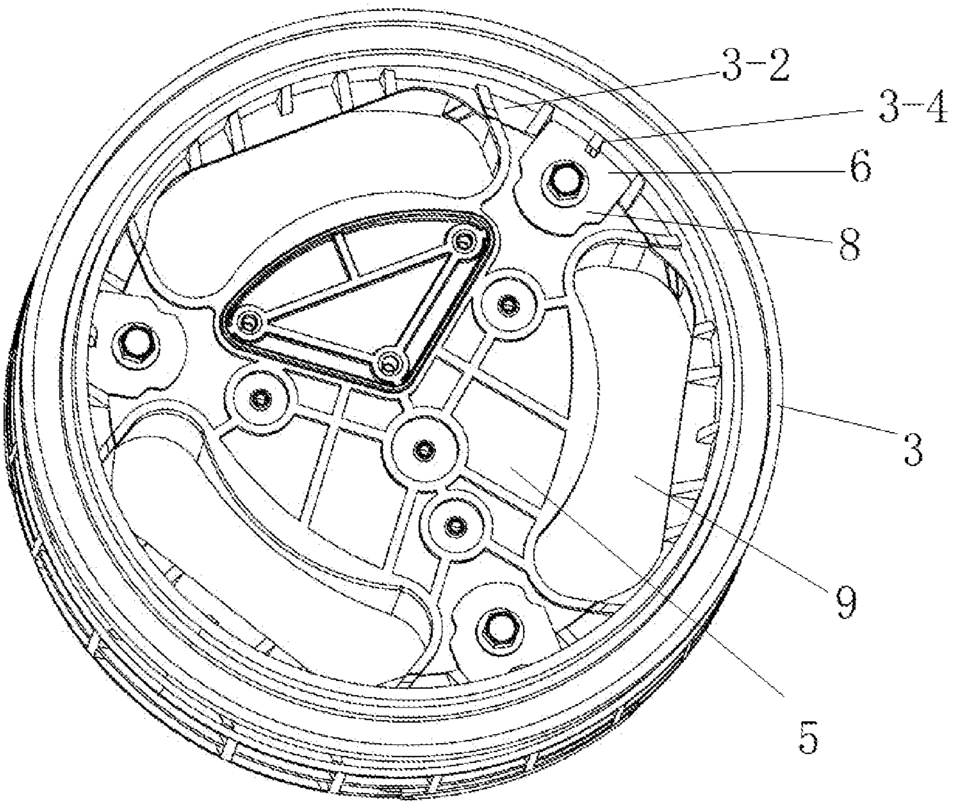
FIG. 1 is a schematic diagram of a quick-replacement end cover structure for an optical fiber splice closure according to an embodiment of this application.
Figure 2:
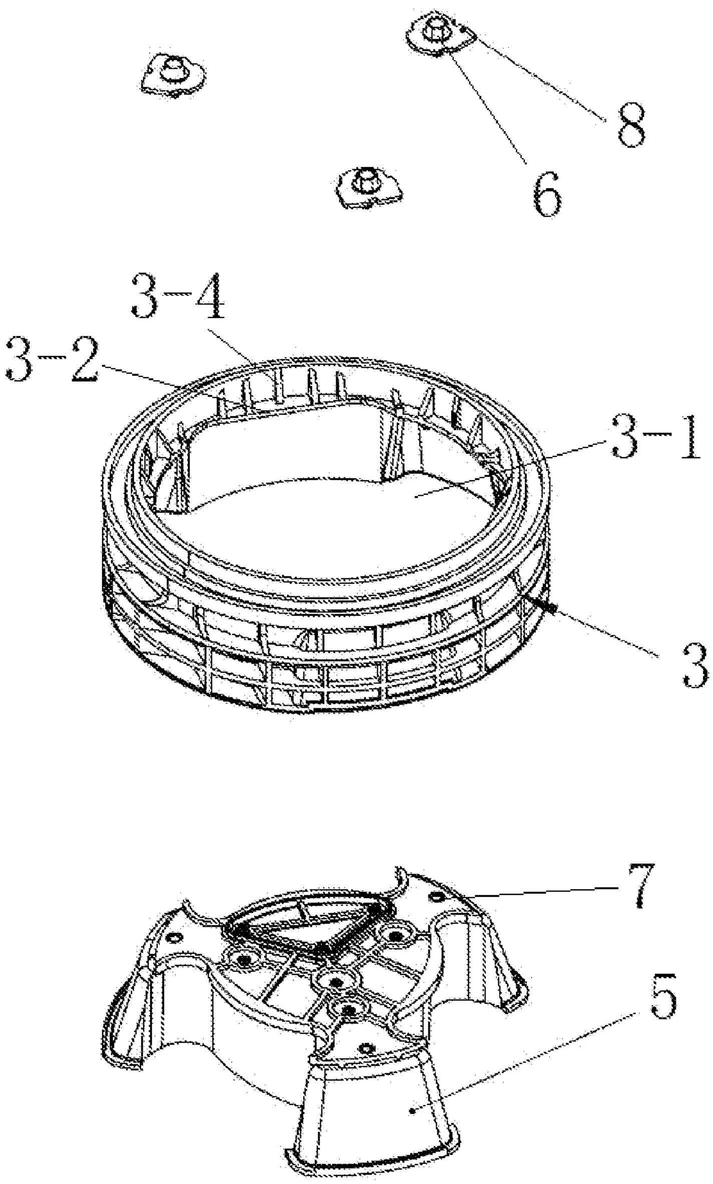
FIG. 2 is an exploded view of a quick-replacement end cover structure for an optical fiber splice closure according to an embodiment of this application.
Figure 3:
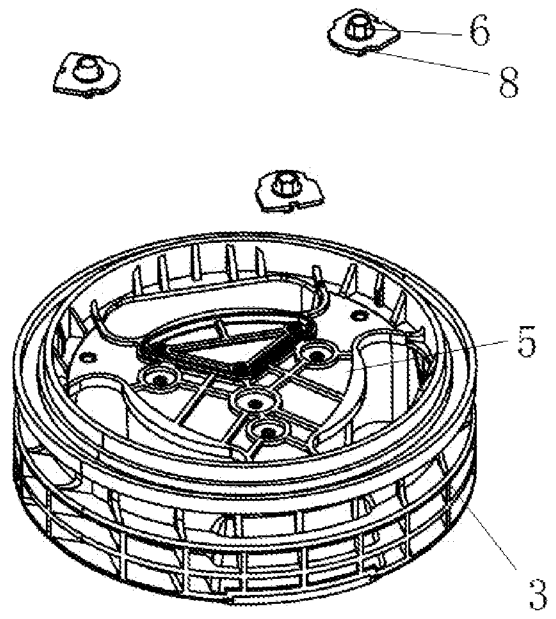
FIG. 3 is an exploded view of a quick-replacement end cover structure for an optical fiber splice closure according to an embodiment of this application.
Figure 4:
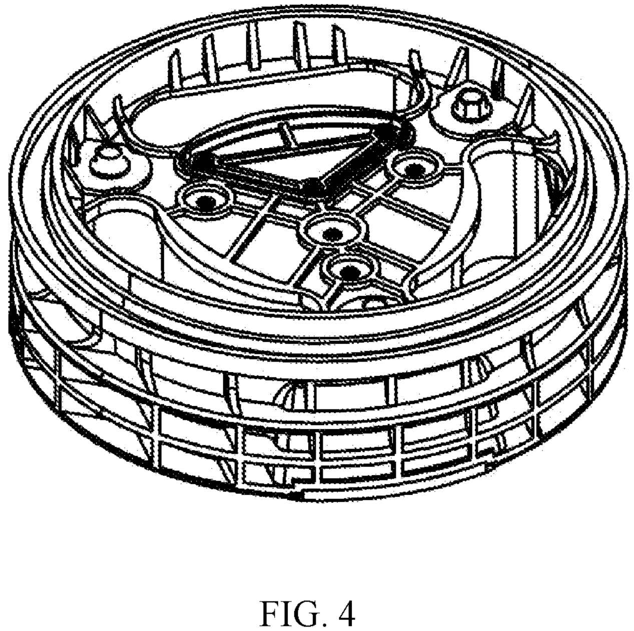
FIG. 4 is a schematic diagram of an assembly completion state of a quick-replacement end cover structure for an optical fiber splice closure according to an embodiment of this application.
Figure 5:
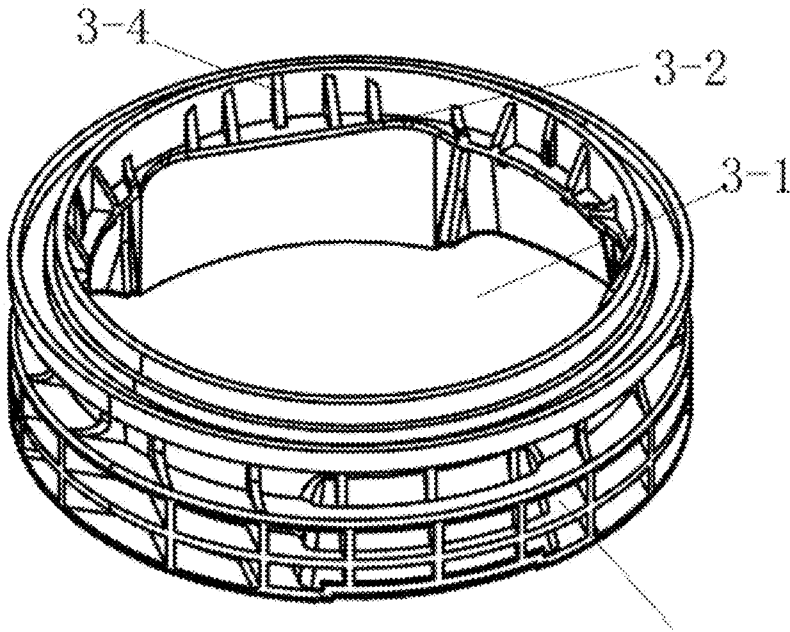
FIG. 5 is a schematic diagram of an end cover housing of a quick-replacement end cover structure for an optical fiber splice closure according to an embodiment of this application.
Figure 6:
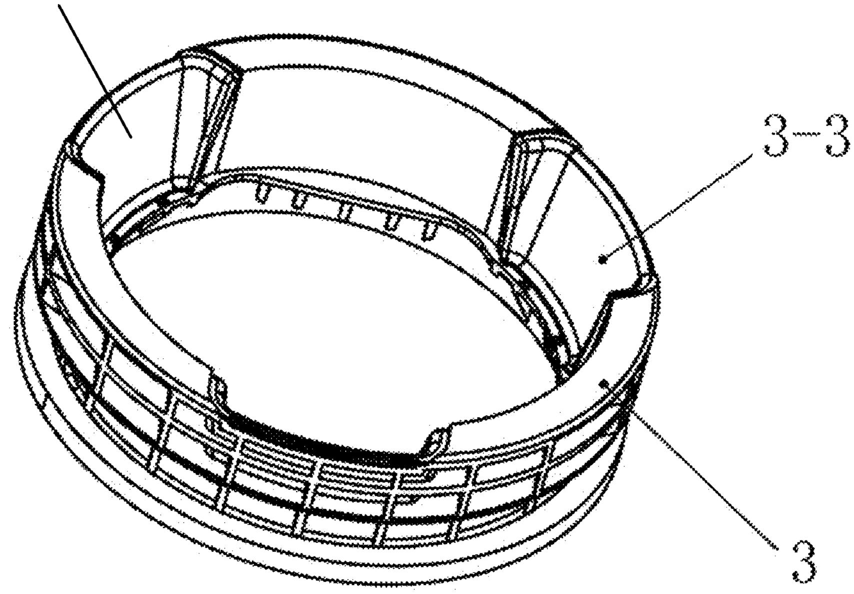
FIG. 6 is a schematic diagram of an end cover housing of a quick-replacement end cover structure for an optical fiber splice closure according to an embodiment of this application.
Figure 7:
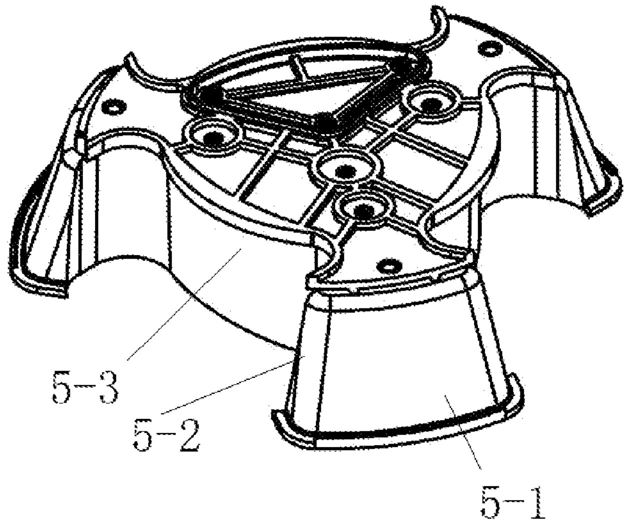
FIG. 7 is a schematic diagram of an inner core main body of a quick-replacement end cover structure for an optical fiber splice closure according to an embodiment of this application.
Figure 8:
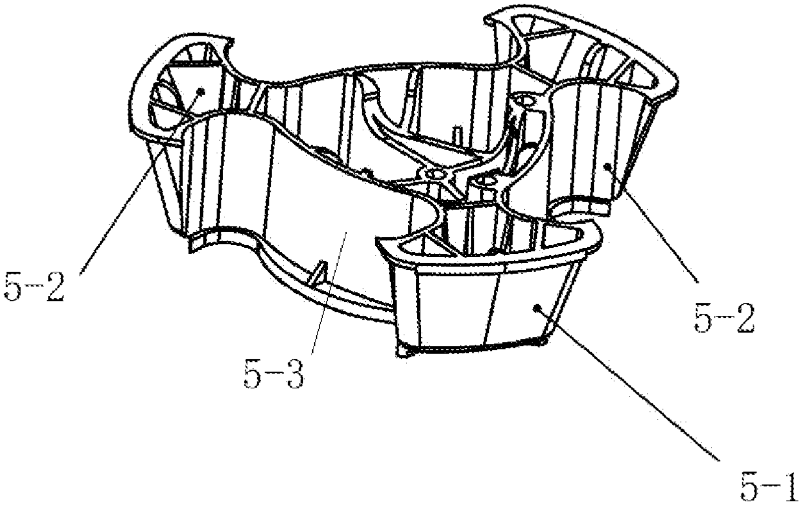
FIG. 8 is a schematic diagram of an inner core main body of a quick-replacement end cover structure for an optical fiber splice closure according to an embodiment of this application.
Figure 9:
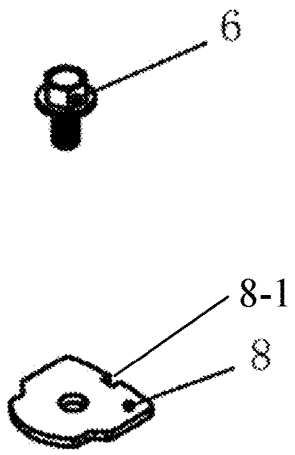
FIG. 9 is a schematic diagram of a first threaded connecting piece and a pressing sheet of a quick-replacement end cover structure for an optical fiber splice closure according to an embodiment of this application.

In the drawings: 1—closure cap structure, 2—hoop structure, 3—end cover housing, 4—internal fusion splice tray structure, 5—inner core main body, 6—first threaded connecting piece, 7—second threaded connecting piece, 8—pressing sheet, 9—mounting feature hole, 10—optical cable entering assembly, 3-1—feature hole; 3-2—axial limiting feature; 3-3—inner conical curved surface feature;

3-4—guiding strip; 5-1—outer conical curved surface feature; 5-2—protruding portion; 5-3—body portion; 8-1—through groove.

DETAILED DESCRIPTION OF THE EMBODIMENT

To make objectives, technical solutions, and advantages of embodiments of the present application clearer, the following clearly and completely describes the technical solutions in the embodiments of the present application with reference to the accompanying drawings of the embodiments of the present application. Apparently, the described embodiments are some but not all of the embodiments of the present application. All other embodiments obtained by those of ordinary skill in the art based on the embodiments of this application without creative efforts shall fall within the protection scope of this application.

Embodiment 1

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The axial limiting feature 3-2 is a limiting lug boss arranged along a circumferential direction of the feature hole 3-1 and extending in a radial direction thereof, and the limiting lug boss is provided with holes for the first threaded connecting pieces 6 to pass through. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are nuts embedded on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. In this technical solution, the limiting lug boss needs to have a certain width. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 2

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The axial limiting feature 3-2 is a limiting lug boss arranged along a circumferential direction of the feature hole 3-1 and extending in a radial direction thereof, and the limiting lug boss is provided with holes for the first threaded connecting pieces 6 to pass through. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are threaded holes machined on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. In this technical solution, the limiting lug boss needs to have a certain width. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 3

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The inner core main body 5 comprises outer conical curved surface features 5-1 arranged in a circumferential rotational symmetry manner relative to a central axis thereof, and the inner wall of the feature hole 3-1 is provided with inner conical curved surface features 3-3 corresponding to the outer conical curved surface features 5-1. The inclined surface cooperation between the outer conical curved surface features 5-1 and the inner conical curved surface features 3-3 can achieve that when the inner core main body 5 of the end cover is placed onto the end cover housing 3, the more the inner core main body 5 is pressed downward, the tighter the assembly between the inner core main body and the end cover housing 3 is, such that the tight cooperation between the inner core main body 5 and the end cover housing 3 is achieved by extrusion, and a layer of silicone rubber is disposed at the inner conical curved surface feature 3-3 to improve the sealing effect. The axial limiting feature 3-2 is a limiting lug boss arranged along a circumferential direction of the feature hole 3-1 and extending in a radial direction thereof, and the limiting lug boss is provided with holes for the first threaded connecting pieces 6 to pass through. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are threaded holes machined on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. In this technical solution, the limiting lug boss needs to have a certain width. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 4

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The inner core main body 5 comprises outer conical curved surface features 5-1 arranged in a circumferential rotational symmetry manner relative to a central axis thereof, and the inner wall of the feature hole 3-1 is provided with inner conical curved surface features 3-3 corresponding to the outer conical curved surface features 5-1. The inclined surface cooperation between the outer conical curved surface features 5-1 and the inner conical curved surface features 3-3 can achieve that when the inner core main body 5 of the end cover is placed onto the end cover housing 3, the more the inner core main body 5 is pressed downward, the tighter the assembly between the inner core main body and the end cover housing 3 is, such that the tight cooperation between the inner core main body 5 and the end cover housing 3 is achieved by extrusion, and a layer of silicone rubber is disposed at the inner conical curved surface feature 3-3 to improve the sealing effect. The inner core main body 5 comprises a body portion 5-3 in a cylindrical shape and three protruding portions 5-2 arranged at intervals along a circumferential direction of the body portion 5-3, and the outer conical curved surface feature 5-1 is disposed on a peripheral surface of each protruding portion 5-2. Three mounting grooves in one-to-one correspondence with the protruding portions 5-2 are disposed on the inner wall of the feature hole 3-1, and the inner conical curved surface feature 3-3 is disposed on a peripheral surface of each mounting groove. The axial limiting feature 3-2 is a limiting lug boss arranged along a circumferential direction of the feature hole 3-1 and extending in a radial direction thereof, and the limiting lug boss is provided with holes for the first threaded connecting pieces 6 to pass through. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are threaded holes machined on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. In this technical solution, the limiting lug boss needs to have a certain width. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 5

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The axial limiting feature 3-2 is a limiting lug boss arranged along a circumferential direction of the feature hole 3-1 and extending in a radial direction thereof. The first threaded connecting pieces 6 are plugged to pressing sheets 8, and the limiting lug boss is located between the pressing sheets 8 and the inner core main body 5. The inner wall of the feature hole 3-1 is provided with guiding strips 3-4 extending along an axial direction thereof, a through groove 8-1 cooperating with the pressing sheet 8 is disposed on the pressing sheet 8, and the pressing sheets 8 and the inner core main body 5 cooperate to clamp the limiting lug boss, so that axial fixation is achieved. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are nuts embedded on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 6

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The axial limiting feature 3-2 is a limiting lug boss arranged along a circumferential direction of the feature hole 3-1 and extending in a radial direction thereof. The first threaded connecting pieces 6 are plugged to pressing sheets 8, and the limiting lug boss is located between the pressing sheets 8 and the inner core main body 5. The inner wall of the feature hole 3-1 is provided with guiding strips 3-4 extending along an axial direction thereof, a through groove 8-1 cooperating with the pressing sheet 8 is disposed on the pressing sheet 8, and the pressing sheets 8 and the inner core main body 5 cooperate to clamp the limiting lug boss, so that axial fixation is achieved. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are threaded holes machined on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 7

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The inner core main body 5 comprises outer conical curved surface features 5-1 arranged in a circumferential rotational symmetry manner relative to a central axis thereof, and the inner wall of the feature hole 3-1 is provided with inner conical curved surface features 3-3 corresponding to the outer conical curved surface features 5-1. The inclined surface cooperation between the outer conical curved surface features 5-1 and the inner conical curved surface features 3-3 can achieve that when the inner core main body 5 of the end cover is placed onto the end cover housing 3, the more the inner core main body 5 is pressed downward, the tighter the assembly between the inner core main body and the end cover housing 3 is, such that the tight cooperation between the inner core main body 5 and the end cover housing 3 is achieved by extrusion, and a layer of silicone rubber 3-3*a* is disposed at the inner conical curved surface feature 3-3 to improve the sealing effect. The axial limiting feature 3-2 is a limiting lug boss arranged along a circumferential direction of the feature hole 3-1 and extending in a radial direction thereof. The first threaded connecting pieces 6 are plugged to pressing sheets 8, and the limiting lug boss is located between the pressing sheets 8 and the inner core main body 5. The inner wall of the feature hole 3-1 is provided with guiding strips 3-4 extending along an axial direction thereof, a through groove 8-1 cooperating with the pressing sheet 8 is disposed on the pressing sheet 8, and the pressing sheets 8 and the inner core main body 5 cooperate to clamp the limiting lug boss, so that axial fixation is achieved. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are threaded holes machined on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. In this technical solution, the limiting lug boss needs to have a certain width. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 8

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. The inner core main body 5 comprises outer conical curved surface features 5-1 arranged in a circumferential rotational symmetry manner relative to a central axis thereof, and the inner wall of the feature hole 3-1 is provided with inner conical curved surface features 3-3 corresponding to the outer conical curved surface features 5-1. The inclined surface cooperation between the outer conical curved surface features 5-1 and the inner conical curved surface features 3-3 can achieve that when the inner core main body 5 of the end cover is placed onto the end cover housing 3, the more the inner core main body 5 is pressed downward, the tighter the assembly between the inner core main body and the end cover housing 3 is, such that the tight cooperation between the inner core main body 5 and the end cover housing 3 is achieved by extrusion, and a layer of silicone rubber is disposed at the inner conical curved surface feature 3-3 to improve the sealing effect. The inner core main body 5 comprises a body portion 5-3 in a cylindrical shape and three protruding portions 5-2 arranged at intervals along a circumferential direction of the body portion 5-3, and the outer conical curved surface feature 5-1 is disposed on a peripheral surface of each protruding portion 5-2. Three mounting grooves in one-to-one correspondence with the protruding portions 5-2 are disposed on the inner wall of the feature hole 3-1, and the inner conical curved surface feature 3-3 is disposed on a peripheral surface of each mounting groove. The axial limiting feature 3-2 is a limiting lug boss arranged along a circumferential direction of the feature hole 3-1 and extending in a radial direction thereof. The first threaded connecting pieces 6 are plugged to pressing sheets 8, and the limiting lug boss is located between the pressing sheets 8 and the inner core main body 5. The inner wall of the feature hole 3-1 is provided with guiding strips 3-4 extending along an axial direction thereof, a through groove 8-1 cooperating with the pressing sheet 8 is disposed on the pressing sheet 8, and the pressing sheets 8 and the inner core main body 5 cooperate to clamp the limiting lug boss, so that axial fixation is achieved. Second threaded connecting pieces 7 for cooperating with the first threaded connecting pieces 6 to fix the inner core main body 5 are disposed on the inner core main body 5. The first threaded connecting pieces 6 are screws, and the second threaded connecting pieces 7 are threaded holes machined on the inner core main body 5. The inner core main body 5 is provided with mounting feature holes 9 for mounting an optical cable entering assembly 10. The screws pass through the holes on the limiting lug boss and then are in threaded connection to the nuts on the inner core main body 5. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 9

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. A clamping device for being connected to optical cables is disposed in the mounting feature hole 9 of the inner core main body 5 to ensure a firm connection of the optical cables. The axial limiting feature 3-2 is a limiting lug boss arranged along a circumferential direction of the feature hole 3-1 and extending in a radial direction thereof. The first threaded connecting pieces 6 are plugged to pressing sheets 8, and the limiting lug boss is located between the pressing sheets 8 and the inner core main body 5. The mounting feature hole 9 of the inner core main body 5 is provided with mounting feature holes for mounting an optical cable entering assembly 10 to ensure that the optical cables enter the closure safely. The screws pass through holes on the limiting lug boss and then are in threaded connection to nuts on the inner core main body 5. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

Embodiment 10

The present invention discloses a quick-replacement end cover structure for an optical fiber splice closure, as shown in FIGS. 1 to 9, comprising an end cover housing 3 for being connected to a closure cap structure 1 and an inner core main body 5 for being connected to an internal fusion splice tray structure 4, where the inner core main body 5 is plugged into the end cover housing 3. The end cover housing 3 is provided with a feature hole 3-1 for plugging of the inner core main body 5, an inner wall of the feature hole 3-1 is provided with an axial limiting feature 3-2 for axially limiting the inner core main body 5, and first threaded connecting pieces 6 arranged to extend along an axial direction of the feature hole are disposed in the feature hole 3-1. An adjustable clamping device for being connected to various types of optical cables is disposed in the mounting feature hole 9 of the inner core main body 5 to adapt to the diameters of different optical cables. The axial limiting feature 3-2 is a limiting lug boss arranged along a circumferential direction of the feature hole 3-1 and extending in a radial direction thereof. The first threaded connecting pieces 6 are plugged to pressing sheets 8, and the limiting lug boss is located between the pressing sheets 8 and the inner core main body 5. The mounting feature hole 9 of the inner core main body 5 is provided with mounting feature holes for mounting an optical cable entering assembly 10 to ensure the stable mounting of the optical cables. The screws pass through holes on the limiting lug boss and then are in threaded connection to nuts on the inner core main body 5. During disassembly, only the following operation is needed: separating the end cover housing 3 and the closure cap structure 1, and then separating the end cover housing 3 and the inner core main body 5 by disassembling the screws. It should be noted that the internal fusion splice tray structure 4 and the optical cable entering assembly 10 on the inner core main body 5 are always of an integrated structure during disassembly and replacement of the end cover housing 3, and do not need to be replaced.

In the above embodiments, the mounting feature holes 9 may be through holes machined on the inner core main body 5 or holes surrounded by the inner core main body 5 and the limiting lug boss on the end cover housing 3.

Figure 10:
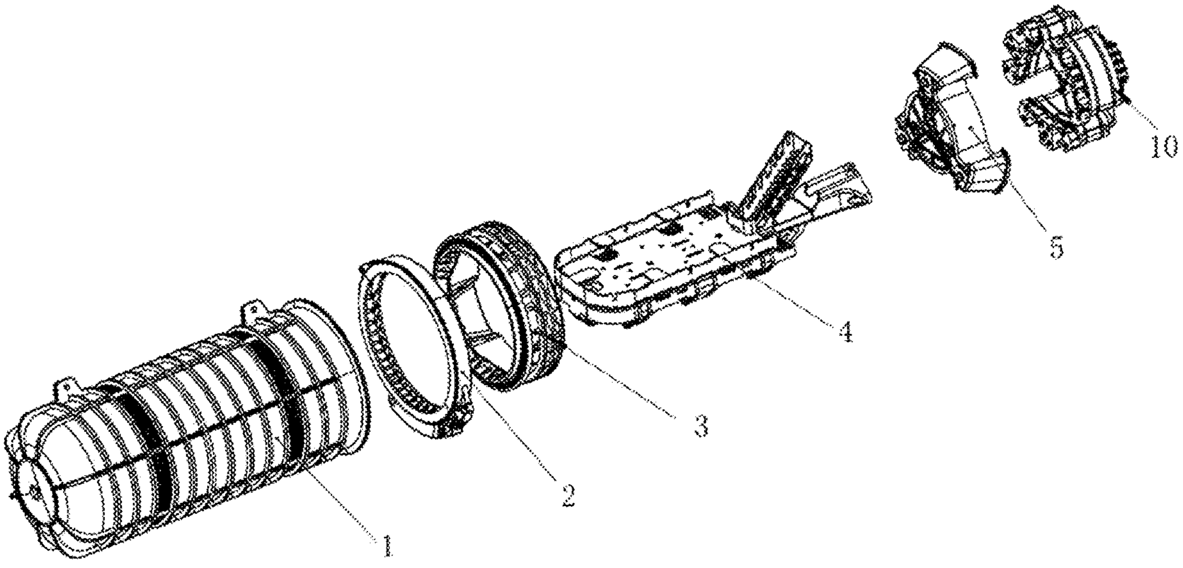
FIG. 10 is a schematic diagram of an optical fiber splice closure according to an embodiment of the present application.

The present invention discloses an optical fiber splice closure, as shown in FIG. 10, comprising a closure cap structure 1 and an end cover, where the closure cap structure 1 and the end cover are connected through a hoop structure 2, and the closure cap structure 1 and the end cover are fixed together to form a closed space, so that the optical fiber splice closure can meet the requirements of industry for sealing, and the end cover is a quick-replacement end cover structure. The closure cap structure 1 is used for covering an inner main body of the optical fiber splice closure, thereby providing a major protective effect. The end cover housing 3 of the present invention cooperates with the end cover inner core 5 and the optical cable entering assembly 7 to form a complete end cover, the end cover and the closure cap structure 1 are mounted together to form a complete enclosed space, and an internal fusion splice tray structure 4 is disposed in the enclosed space. The internal fusion splice tray structure 4 is used for bearing optical fibers, an optical device, and an optical module. The internal fusion splice tray structure 4 may also be referred to as an optical fiber tray structure, the optical cable entering assembly 7 may also be referred to as a sealing piece or a rear end cover structure, and the optical cable entering assembly may be made of gel. The shape and structure of the internal fusion splice tray structure 4 correspond to the parts where the closure cap structure 1 and the inner core main body 5 are connected. The optical cable entering assembly 7 is disposed on one side of the inner core main body 5, and the optical cable entering assembly 7 is made of a metal material. Input optical cables first pass through the optical cable entering assembly 7, and then are split through the inner core main body 5. The end cover may be referred to as an end surface structure.

Preferably, an outer layer of the closure cap structure 1 is provided with an anti-vibration and reinforcing texture. In the present embodiment, the texture of a plastic material is transversely and longitudinally disposed in a staggered manner, which can achieve the effect of structural reinforcement. In the case of inadvertent dropping, the texture of the outer layer of the closure cap structure 1 can also achieve a certain anti-vibration effect.

The shape of the closure cap structure 1 of the present invention is not limited. In this embodiment, the closure cap structure 1 is in a cylinder shape, and cuboid or other irregular shapes may also be used in other embodiments. The function of the closure cap structure 1 is to protect an optical module, an active device, an optical device, optical fiber cables, and the like in the closure cap, and fixedly connects the closure cap structure 1 and the end cover. The internal fusion splice tray structure 4 is disposed inside the closure cap structure 1, and a tail end of the internal fusion splice tray structure 4 is fixedly connected to the inner core main body 5. The internal fusion splice tray structure 4 may be mounted with one or more layers of optical fiber trays, and may also be mounted with an optical module or another active device. The active device may be powered by a battery, and may also be powered by importing one power cord via the optimal cables. Both fused and unfused optical fibers are stored on the internal fusion splice tray structure 4.

The shape of the end cover housing 3 of the present invention is not limited, and the shape and structure thereof correspond to the part connected to the closure cap structure 1. The end cover housing 3 and the inner core main body 5 are used for the entry of optical fibers and output of the optical fibers after being split in the optical fiber splice closure, so that the optical fiber splice closure forms a sealed whole, and meets the requirements for the service environment.

It should be noted that the closure cap structure 1, the end cover housing 3, the inner core main body 5 and the optical cable entering assembly 10 described specifically in the present invention all belong to the prior art.

In the description of the present application, it should be noted that, the orientations or positional relationships indicated by the terms "up", "down", etc. are based on those shown in the accompanying drawings, intended only for the convenience of describing the present application and for simplifying the description, and not intended to indicate or imply that the referred apparatus or element must be provided with a particular orientation or constructed and operated with a particular orientation, therefore not allowed to be construed as a limitation of the present application. Unless otherwise explicitly specified and limited, the terms "mount", "attach", "connect" should be understood in a broad sense, e.g., it may be a fixed connection, a detachable connection or an integral connection; it may be a mechanical connection or an electrical connection; it may be a direct attachment, or an indirect attachment through an intermediate medium; and it may be a communication within two elements. Those of ordinary skill in the art can understand specific meanings of these terms in this application based on specific situations.

It should be noted that in the present application, relational terms such as "first" and "second" are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. Without more limitations, elements defined by a sentence "include a . . . " do not exclude that a process, method, article or terminal device including the elements also include other identical elements.

The foregoing descriptions are merely specific implementations of the present application, so that those skilled in the art can understand or implement the present application. Various modifications to the embodiments are obvious to those skilled in the art, and general principles defined in this specification may be implemented in other embodiments without departing from the spirit or scope of the present application. Therefore, the present application will not be limited to the embodiments described in this specification but extends to the widest scope that complies with the principles and novelty applied in this specification.

What is claimed is:

1. A quick-replacement end cover structure for an optical fiber splice closure, comprising:

an end cover housing (3) for being connected to a closure cap structure (1) and an inner core main body (5) for being connected to an internal fusion splice tray structure (4), wherein the end cover housing (3) is provided with a feature hole (3-1) for plugging of the inner core main body (5), an inner wall of the feature hole (3-1) is provided with an axial limiting feature (3-2) for axially limiting the inner core main body (5), first threaded connecting pieces (6) arranged to extend along an axial direction of the feature hole are disposed in the feature hole (3-1), and second threaded connecting pieces (7) for cooperating with the first threaded connecting pieces (6) to fix the inner core main body (5) are disposed on the inner core main body (5), wherein the inner core main body (5) comprises outer conical curved surface features (5-1) arranged in a circumferential rotational symmetry manner relative to a central axis thereof, and the inner wall of the feature hole (3-1) is provided with inner conical curved surface features (3-3) corresponding to the outer conical curved surface features (5-1), and wherein the axial limiting feature (3-2) is a limiting lug boss arranged along a circumferential direction of the feature hole (3-1) and extending in a radial direction thereof, the limiting lug boss is provided with holes for the first threaded connecting pieces (6) to pass through, and the first threaded connecting pieces (6) pass through the holes on the limiting lug boss and are in threaded connection with the second threaded connecting pieces (7) on the inner core main body (5) to fix the inner core main body (5) within the feature hole (3-1).

2. The quick-replacement end cover structure for an optical fiber splice closure according to claim 1, wherein the inner core main body (5) comprises a body portion (5-3) in a cylindrical shape and a plurality of protruding portions (5-2) arranged at intervals along a circumferential direction of the body portion (5-3), and the outer conical curved surface feature (5-1) is disposed on a peripheral surface of each protruding portion (5-2).

3. The quick-replacement end cover structure for an optical fiber splice closure according to claim 2, wherein mounting grooves in one-to-one correspondence with the protruding portions (5-2) are disposed on the inner wall of the feature hole (3-1), and the inner conical curved surface feature (3-3) is disposed on a peripheral surface of the mounting groove.

4. The quick-replacement end cover structure for an optical fiber splice closure according to claim 3, wherein a silicone rubber for improving a sealing effect is disposed on the inner conical curved surface feature (3-3).

5. The quick-replacement end cover structure for an optical fiber splice closure according to claim 1, wherein pressing sheets (8) are plugged to the first threaded connecting pieces (6), and the limiting lug boss is located between the pressing sheets (8) and the inner core main body (5).

6. The quick-replacement end cover structure for an optical fiber splice closure according to claim 5, wherein the inner wall of the feature hole (3-1) is provided with guiding strips (3-4) extending along an axial direction thereof, and a through groove (8-1) cooperating with the pressing sheet (8) is disposed on the pressing sheet (8).

7. The quick-replacement end cover structure for an optical fiber splice closure according to claim 1, wherein the inner core main body (5) is provided with mounting feature holes (9) for mounting an optical cable entering assembly (10).

8. An optical fiber splice closure, comprising a closure cap structure (1) and an end cover, wherein the end cover is the quick-replacement end cover structure according to claim 1.

* * * * *